US006406368B1

(12) United States Patent
Cruson et al.

(10) Patent No.: US 6,406,368 B1
(45) Date of Patent: Jun. 18, 2002

(54) STRAW AND CHAFF SPREADER WITH SPREAD TO THE REAR

(75) Inventors: Izaak Cruson; David Corriveau; Gerald Flaman, all of Pilot Butte (CA)

(73) Assignee: Dutch Blacksmith Shop Ltd., Saskatchewan (CA)

( * ) Notice: Subject to any disclaimer, the term of this patent is extended or adjusted under 35 U.S.C. 154(b) by 0 days.

(21) Appl. No.: 09/666,723

(22) Filed: Sep. 20, 2000

(51) Int. Cl.[7] .................................................. A01F 12/40
(52) U.S. Cl. ........................ 460/111; 460/112; 241/186.3
(58) Field of Search ............................. 56/503; 460/112, 460/111, 59, 44, 901, 71, 63, 66, 79; 241/243, 186.3; 239/666, 677, 7, 684, 676, 671, 672, 661, 655, 679, 682, 689

(56) References Cited

U.S. PATENT DOCUMENTS

| | | | |
|---|---|---|---|
| 2,848,238 A | * | 8/1958 | Stevens ........................ 239/666 |
| 3,539,113 A | * | 11/1970 | Tyler ............................ 239/673 |
| 4,591,102 A | * | 5/1986 | Clarke .......................... 239/655 |
| 4,617,942 A | | 10/1986 | Garner |
| 4,892,504 A | | 1/1990 | Scott et al. |
| 4,917,652 A | | 4/1990 | Glaubitz et al. |
| 5,021,030 A | | 6/1991 | Halford et al. |
| 5,120,275 A | | 6/1992 | Zacharias |
| 5,215,500 A | | 6/1993 | Kirby |
| 5,797,793 A | | 8/1998 | Matousek et al. |
| 5,976,011 A | | 11/1999 | Hartman |
| 6,149,079 A | * | 11/2000 | Kinkead et al. ............ 239/668 |

FOREIGN PATENT DOCUMENTS

CA   1179567   12/1984

\* cited by examiner

*Primary Examiner*—Robert E. Pezzuto
*Assistant Examiner*—Árpád Fábián Kovács
(74) *Attorney, Agent, or Firm*—Henderson & Strum LLP

(57) ABSTRACT

An apparatus for attachment to a rear end of a combine for spreading straw and chaff comprises a pair of side-by-side rotating pans with attached blades for spreading chaff, with a straw spreader attached to and above each pan to spread straw before same falls onto the pans. Each pan is enclosed at the front by a vertical wall with an opening to allow chaff to exit to the rear and side. A lip extends from the top of the wall toward the center of the pan to enhance the air blast and increase the distance chaff is blown. Rear deflectors allow the amount of chaff directed to the rear to be varied.

11 Claims, 3 Drawing Sheets

STRAW AND CHAFF SPREADER WITH SPREAD TO THE REAR

This invention is in the field of harvesting equipment and in particular devices for spreading straw and chaff expelled from combines.

BACKGROUND

It has long been recognized that straw and chaff expelled from the rear of combines should be evenly spread across the ground. The advent of minimum tillage and no-till seeding has increased the need for this even spread.

Prior art in the field includes U.S. Pat. No. 5,976,011 to Hartman, U.S. Pat. No. 5,797,793 to Matousek et al., U.S. Pat. No. 5,215,500 to Kirby, U.S. Pat. No. 5,120,275 to Zacharias, U.S. Pat. No. 5,021,030 to Halford, U.S. Pat. No. 4,917,652 to Glaubitz et al., U.S. Pat. No. 4,892,504 to Scott et al. and U.S. Pat. No. 4,617,942 to Garner, as well as Canadian Patent Number 1,179,567 to Clarke.

Different crops and conditions result in different spread patterns. For instance straw and chaff from wheat will generally have a different spread than that from canola or peas. The amount of moisture in the straw and chaff also affects the spread pattern. Generally the straw and chaff contains more moisture, or is "tough", in the morning and dries out as the day progresses, causing the spread pattern to vary through-out the day.

The variation in the spread pattern as moisture changes is caused in part by the fact that the location where the straw and chaff is expelled from the rear discharge of the combine can vary as moisture varies. The discharge area is a generally horizontal opening with a back wall and the spreading device located generally under the discharge area. When dry, the straw and chaff is thrown right to the back wall of the discharge area and falls down, however as moisture in the straw and chaff increases, it is not thrown as far and so lands nearer the front of the discharge area.

The change in spread pattern is particularly noticeable with a single rotor spreader such as that of U.S. Pat. No. 5,215,500 to Kirby. There, material falling onto the device in front of the center is directed largely out one side while material falling behind center is directed largely out the opposite side. In order to maintain an even spread, it is necessary to adjust the fore and aft position of the device as moisture varies. In Kirby as well, chaff moves only to the side and not the rear of the combine.

Present day combines cut an increasingly wide swath, up to 50 feet or more. As it is desirable to spread straw and chaff across the whole of the swath, increased spreading distance is required over that available in the prior art. The chaff, being very light, must be spread by an air blast, as any momentum imparted to a piece of chaff is quickly overcome by air resistance.

The prior art generally provides limited adjustment for changing the spread pattern for varying crops or conditions. Often it is only the rotational speed of the device which is adjustable. Adjustment of the amount of chaff directed to the rear of the combine is particularly limited in the prior art.

The prior art as well is often directed only at spreading chaff, requiring a separate mechanism for spreading straw. Devices which spread both straw and chaff, such as the apparatus of U.S. Pat. No. 4,892,504 to Scott et al., are often complex and costly.

SUMMARY OF THE INVENTION

It is the object of the present invention to provide a straw and chaff spreader for a combine that can maintain an even spread pattern in different crops and conditions, and yet is simple and economical to manufacture.

It is a further object of the invention to provide such a spreader that creates an increased air blast suitable for spreading chaff across the wide swaths cut by present combines.

It is a further object of the invention to provide such a spreader that includes improved adjustments for varying the amount of chaff delivered to the rear of the combine.

The invention provides, in one aspect, an apparatus for attachment to a rear end of a combine for spreading straw and chaff expelled therefrom, the combine having a left side and a right side relative to an operating travel direction, and a center-line parallel to the operating travel direction in substantially a center of a rear discharge of the combine. The apparatus comprises a frame adapted for attachment to the rear end of a combine generally under the rear discharge thereof such that straw and chaff expelled from the rear discharge falls onto the apparatus. A left substantially circular pan is rotatably mounted substantially horizontally above the frame on a left side of the frame, the left pan having an inside adjacent to the center-line, and an opposite outside and a drive extends through the frame to rotate the left pan in a clockwise direction when viewed from above. A right substantially circular pan is rotatably mounted substantially horizontally above the frame on a right side of the frame, the right pan having an inside adjacent to the center-line, and an opposite outside, the right pan mounted equidistant from the center-line as the left pan, a center of the left and right pans lying on a base-line substantially perpendicular to the operating travel direction. A drive extends through the frame to rotate the right pan in a counter-clockwise direction when viewed from above. A left wall extends substantially vertically from the frame, the left wall having a first end in proximity to the base-line in proximity to the outside of the left pan, the left vertical wall substantially following an outer edge of the left pan from the base-line towards the combine and around the inside of the left pan to a second end thereof located between 240 and 260 degrees from the first end, leaving a left opening of between 100 and 120 degrees between the first and second ends. A right wall extends substantially vertically from the frame, the right wall having a first end in proximity to the base-line in proximity to the outside of the right pan, the right vertical wall substantially following an outer edge of the right pan from the base-line towards the combine and around the inside of the right pan to a second end thereof located between 240 and 260 degrees from the first end, leaving a right opening of between 100 and 120 degrees between the first and second ends. A plurality of vertically oriented blades are attached to a top of each pan, each blade extending substantially from a center of one of the pans to the outer edge thereof. A lip extends from a front top edge of each wall substantially perpendicularly towards the center of the corresponding pan, the lip beginning at substantially the first end of the wall and continuing to at least the intersection of the base-line and the wall. A drive member extends substantially vertically from the center of each pan and rotating therewith and a straw spreader is attached to a top end of each drive member.

The double spreaders spread straw and chaff to each side essentially independently of the fore and aft location where it falls onto the apparatus. What falls on the left side is thrown to the left and rear, and what falls on the right side is thrown to the right and rear. Straw is spread simply by the apparatus as well as chaff, utilizing the same drive for both the upper straw spreader and the lower disc/blade chaff spreader.

The lip extending from the top of the vertical walls toward the pan centers acts to increase the air flow created by the blades and thus the distance the chaff is spread.

Adjustable deflectors may be added to allow the amount of chaff spread behind the combine to be varied.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
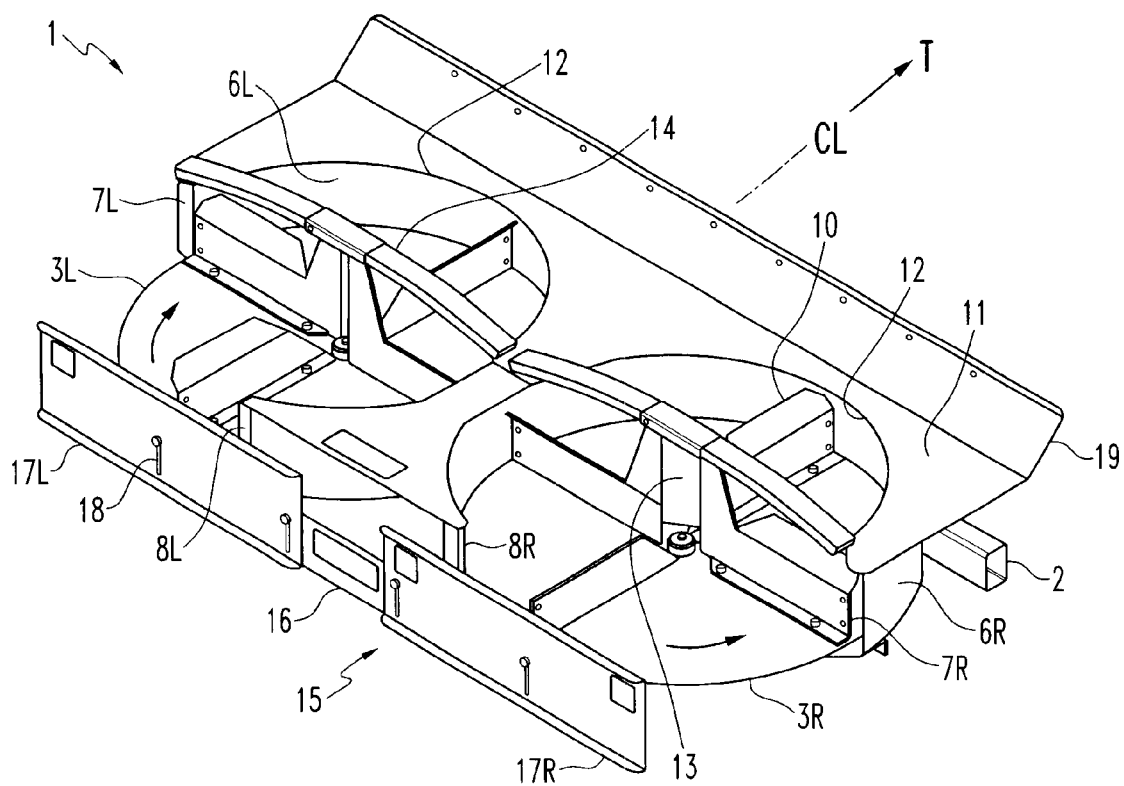
FIG. 1 is a perspective view of an embodiment of the invention.
Figure 2:
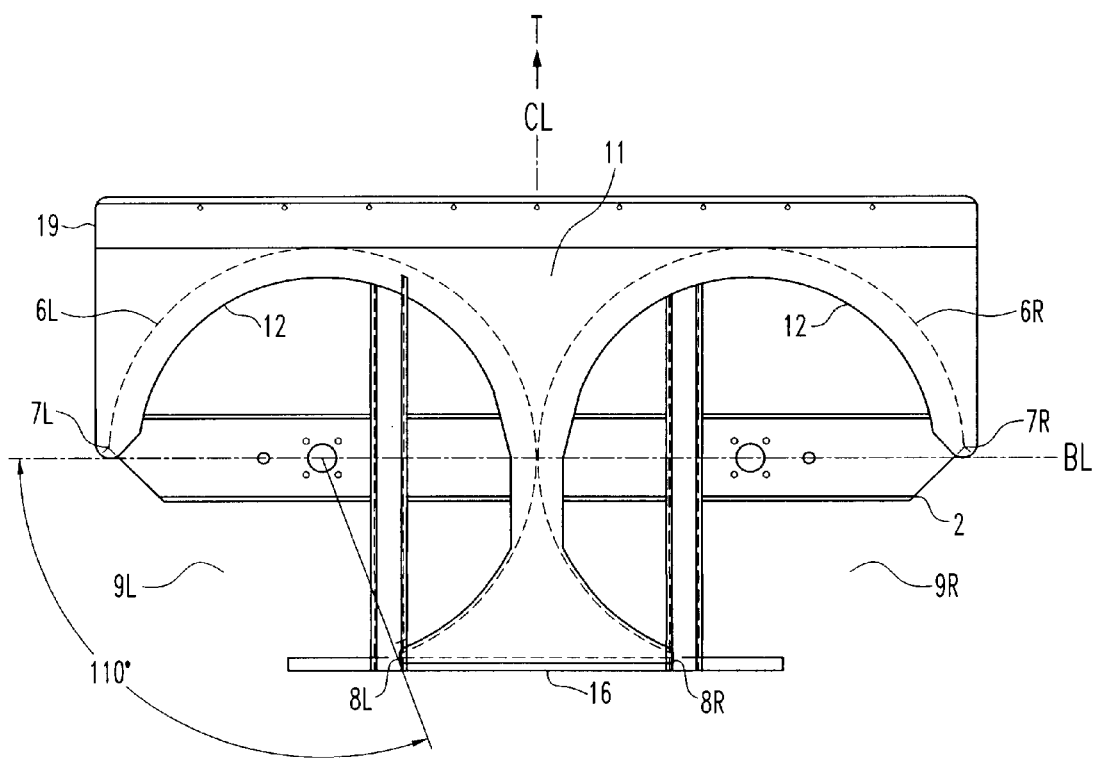
FIG. 2 is a top view of the frame of the embodiment of FIG. 1.
Figure 3:
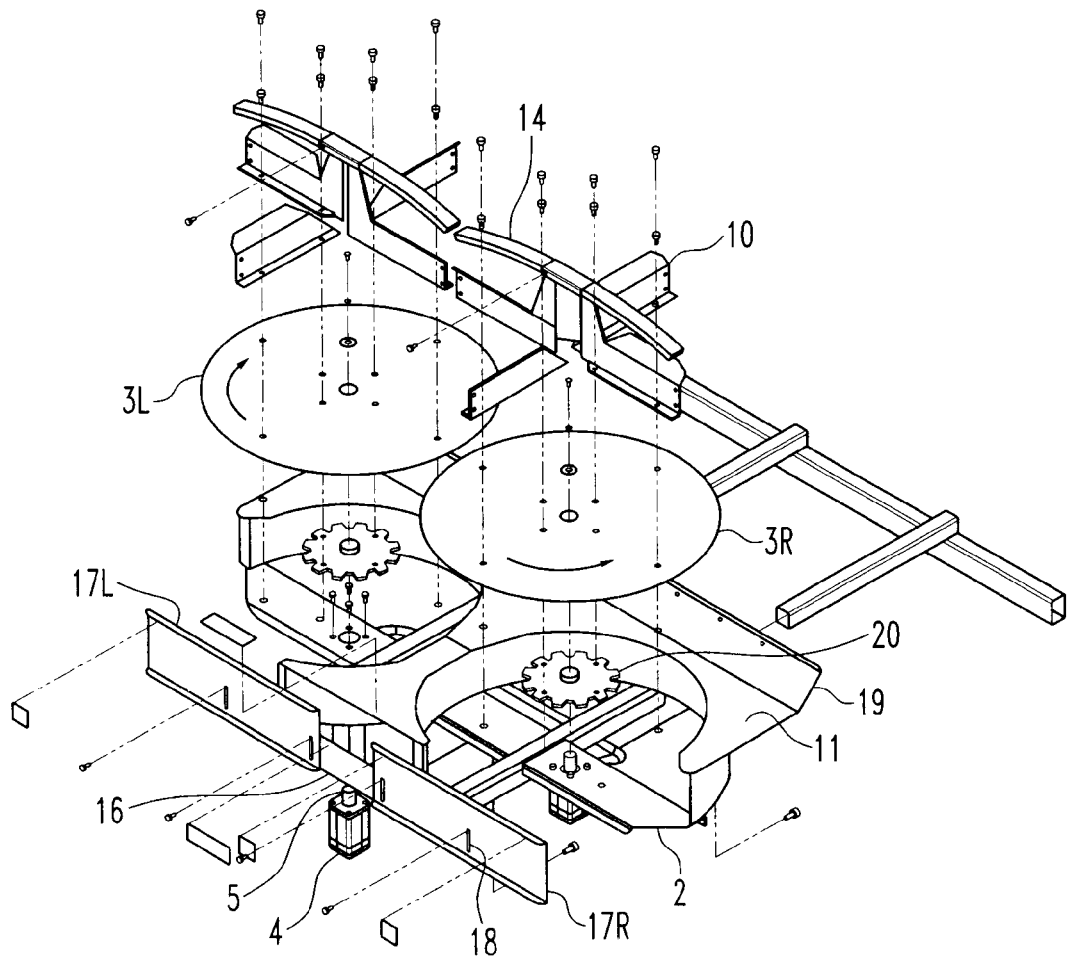
FIG. 3 is an exploded view of the embodiment of FIG. 1.

FIG. 1 illustrates an apparatus 1 for attachment to the rear end of a combine for spreading straw and chaff expelled therefrom. The combine has a left side and a right side relative to an operating travel direction T, and a center-line CL parallel to the operating travel direction in substantially a center of the rear discharge of the combine. The combine is not illustrated as same are well known and the apparatus 1 can be readily attached to any of a number of conventional combines. References to "inside" hereafter will refer to that part nearer the center-line CL, while references to "outside" will refer to that part farther from the center-line CL.

The apparatus 1 comprises a frame 2 adapted for attachment to the rear end of a combine generally under the rear discharge thereof such that straw and chaff expelled from the rear discharge falls onto the apparatus 1. A left circular pan 3L is rotatably mounted horizontally above the frame 2 on a left side of the frame 2. A drive-shaft 4 extends from a hydraulic motor 5 through the frame 2 to rotate the left pan 3L in a clockwise direction when viewed from above.

A right circular pan 3R is rotatably mounted horizontally above the frame 2 on a right side of the frame 2. The right pan 3R is mounted equidistant from the center-line CL as the left pan 3L. The centers of the left and right pans 3L, 3R form a base-line BL substantially perpendicular to the operating travel direction T. A drive-shaft 4 extends from a hydraulic motor 5 through the frame 2 to rotate the right pan 3R in a counter- clockwise direction when viewed from above. In the drawings the pans 3L, 3R are each attached to a reinforcing member 20.

A left wall 6L extends vertically from the frame 2. The left wall 6L has a first end 7L in proximity to the baseline BL in proximity to the outside of the left pan 3L, an then follows an outer edge of the left pan 3L from the base-line BL towards the combine and around the inside of the left pan 3L to a second end 8L located approximately 250 degrees from the first end 7L, leaving a left opening 9L of 110 degrees between the first and second ends 7L, 8L.

Similarly, a right wall 6R extends vertically from the frame 2. The right wall 6R has a first end 7R in proximity to the base-line BL in proximity to the outside of the right pan 3R, an then follows an outer edge of the right pan 3R from the base-line BL towards the combine and around the inside of the right pan 3R to a second end 8R located approximately 250 degrees from the first end, leaving a right opening 9R of 110 degrees between the first and second ends 7R, 8R.

A plurality of vertically oriented blades 10 are attached to the top of each pan 3L, 3R, each blade 10 extending from the center of one of the pans to the outer edge thereof.

The blades 10 have a top edge forward of a bottom edge thereof, in the direction of rotation thereof, to collect air and create the air blast required to effectively spread the chaff a substantial distance.

A top plate 11 lies on top of the walls 6L, 6R. The top plate prevents chaff from falling through the apparatus 1 and also extends from the front top edge of each wall 6L, 6R perpendicularly towards the center of the corresponding pan to create a lip 12 beginning at the first end of each wall and continuing somewhat past the intersection of the base-line BL and the wall. This lip substantially increases the air blast created by the blades 10.

A flange 19 at the front of the top plate 11 allows for attachment of a directing sheet to direct chaff onto the apparatus 1.

A drive member 13 extends substantially vertically from the center of each pan and rotates with the pan. A straw spreader 14 is attached to a top end of each drive member 13. Typically the straw spreader 14 is length of stiff rubber or the like. The straw spreader 14 spreads the lengthy straws as they fall, but the chaff for the most part falls through onto the pans 3L, 3R. With the straw removed, a significant air blast can be created by the blades 10 to spread the chaff. When attempting to spread the straw and chaff together, the heavy volume of straw interferes with the creation of the air blast, reducing the effective spread of chaff.

With the double spreaders of the present invention, it is not critical how far back the straw and chaff fall on the apparatus 1, as substantially whatever falls on the left is spread to the left and left rear, and whatever falls on the right is spread to the right and right rear.

The lip 12 enables creation of a significantly stronger air-blast than prior art spreaders, increasing the possible width of spread.

In the illustrated embodiment a deflector assembly 15 partially blocks the left and right openings 9L, 9R. The deflector assembly 15 comprises a fixed deflector bracket 16 attached across the back end of the frame 2 to the second ends 8L, 8R of each wall 6L, 6R. The deflector bracket 16 partially blocks the openings 9L, 9R extending from a vertical midpoint in the lower portion of the second end 8L, 8R of each wall 6L, 6R down to the corresponding pan and outward from the center-line. Adjustable deflector plates 17L, 17R are attached to each end of the deflector bracket 16 by bolts through slots 18, thereby allowing the deflector plates 17L, 17R to be adjusted vertically such that a top edge thereof is movable from a vertical location substantially parallel with the top edge of the wall 6L or 6R, to a vertical location substantially parallel with a top edge of the deflector bracket 16. The slots 18 are further arranged such that the deflector plates 17L, 17R may be oriented so that the top edges thereof are slanted up or down.

Adjusting the position of the deflector plates 17L, 17 R allows the amount of chaff spread directly behind the combine to be controlled so that an even spread is accomplished.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An apparatus for attachment to rear end of a combine for spreading straw and chaff expelled therefrom, the combine having a left side and a right side relative to an opening travel direction, and a center-line parallel to the operating travel direction in substantially a center of a rear discharge of the combine, the apparatus comprising:

a frame adapted for attachment to the rear end of a combine generally under the rear discharge thereof such that straw and chaff expelled from the rear discharge falls onto the apparatus;

a left substantially circular pan rotatably mounted substantially horizontal above the frame on a left side of the frame, the left pan having an inside adjacent to the center-line, and an opposite outside;

a dive extending through the frame to rotate the left pan in a clockwise direction when viewed from above;

a right substantially circular pan rotatably mounted substantially horizontally above the frame on a right side of the frame, the right pan having an inside adjacent to the center-line, and an opposite outside, the right pan mounted equidistant from the center-line as the left pan, a center of the left and right pans lying on a base-line substantially perpendicular to the operating travel direction;

a drive extending through the frame to rotate the right pan in a counter-clockwise direction when viewed from above;

a left wall extending substantially vertically from the frame, the left wall having a first end in proximity to the base-line in proximity to the outside of the left pan, the left vertical wall substantially following an outer edge of the left pan from the base-line towards the combine and around the inside of the left pan to a second end thereof located between 240 and 260 degrees from the first end, leaving a left opening of between 100 and 120 degrees between the first and second ends;

a right wall extending substantially vertically from the frame, the right wall having a first end in proximity to the base-line in proximity to the outside of the right pan, the right vertical wall substantially following an outer edge of the right pan from the base-line towards the combine and around the inside of the right pan to a second end thereof located between 240 and 260 degrees from the first end, leaving a right opening of between 100 and 120 degrees between the first and second ends;

a plurality of vertically oriented blades attached to a top of each pan, each blade extending substantially from a center of one of the pans to the edge thereof;

a lip extending from a front top edge of each wall substantially perpendicularly towards the center of the corresponding pan, the lip begining at substantially the first end of the wall and continuing to at least the intersection of the base-line and the wall;

a drive member extending substantially vertically from the center of each pan and rotating therewith; and a straw spreader attached to a top end of each drive member.

2. The apparatus of claim 1 further comprising a deflector plate partially blocking the left and right openings.

3. The apparatus of claim 2 wherein the deflector is adjustable such that a blocked portion of the openings can be varied.

4. The apparatus of claim 3 wherein the deflector comprises:

a fixed portion extending from a vertical midpoint of the second end of each wall down to the corresponding pan and outward from the center-line; and an adjustable portion attached to the fixed portion and vertically adjustable such that a top edge thereof is movable from a vertical location substantially parallel with the top edge of the wall to a vertical location substantially parallel with a top edge of the fixed portion.

5. The apparatus of claim 4 wherein the adjustable portion is adjustable such that the top edge thereof is slanted up or down.

6. The apparatus of claim 1 wherein the blades have a top edge forward of a bottom edge thereof, in the direction of rotation thereof.

7. The apparatus of claim 5 wherein the blades have a top edge forward of a bottom edge thereof, in the direction of rotation thereof.

8. The apparatus of claim 1 wherein the second ends of the left and right walls are located at approximately 250 degrees from the first ends of the respective walls.

9. The apparatus of claim 5 wherein the second ends of the left and right walls are located at approximately 250 degrees from the first ends of the respective walls.

10. The apparatus of claim 1 wherein four blades are attached to the top of each pan, at substantially ninety degrees to each other.

11. The apparatus of claim 5 wherein four blades are attached to the top of each pan, at substantially ninety degrees to each other.

* * * * *